United States Patent [19]
Lee

[11] Patent Number: 5,693,225
[45] Date of Patent: Dec. 2, 1997

[54] DOWNHOLE FLUID SEPARATION SYSTEM

[75] Inventor: Lawrence Che-Keung Lee, Bartlesville, Okla.

[73] Assignee: Camco International Inc., Houston, Tex.

[21] Appl. No.: 725,112

[22] Filed: Oct. 2, 1996

[51] Int. Cl.$^6$ .................................................. B01D 21/26
[52] U.S. Cl. ..................... 210/512.2; 210/170; 210/243; 210/322; 210/360.1; 210/512.1; 209/720; 209/721; 209/729; 209/732; 209/733; 209/734; 96/136; 55/401; 55/459.1; 166/265
[58] Field of Search ................................. 210/170, 512.1, 210/322, 512.2, 787, 243, 360.1; 55/459.1, 401, 459.2, 459.3, 459.4, 459.5; 209/728, 729, 734, 715, 719, 720, 725, 732, 733; 166/265; 96/136

[56] References Cited

U.S. PATENT DOCUMENTS 5,296,153  3/1994  Peachey ................................. 210/787
5,456,837  10/1995 Peachey ................................. 210/512.2

FOREIGN PATENT DOCUMENTS

94/13930  12/1993  WIPO.

*Primary Examiner*—David A. Reifsnyder

[57] ABSTRACT

A downhole fluid separation system is used with submergible pumping systems to separate downhole fluids into different density fluids, recover the lighter fluids to the earth's surface, and dispose the heavier fluids downhole. The fluid separation system includes a plurality of housings connectable one to another, each housing having one or more fluid separators, such as hydrocyclones, therein with an inlet of each fluid separator in communication with an inlet conduit, an overflow of each fluid separator in communication with an overflow conduit, and an underflow of each fluid separator in communication with an underflow conduit. The fluid separation system can be configured for parallel flow where the conduits conveying fluids downstream of a first housing have a greater cross-sectional flow area than corresponding conduits in an adjacent second housing. Also, the fluid separation system can be configured for series flow, for either the separated lighter or the separated heavier fluids. The use of differing sized conduits in the housings as required for the actual flow rates in each housing enable higher flow capacity fluid separators to be used than previously possible for greater fluid handling efficiency.

13 Claims, 4 Drawing Sheets 5,693,225

DOWNHOLE FLUID SEPARATION SYSTEM

BACKGROUND OF THE INVENTION

1. Field of the Invention

The present invention relates to a system for the downhole separation of fluids and, more particularly, to such a system that separates oil from water within a wellbore and that disposes of the separated water within the wellbore.

2. Description of Related Art

In many oil fields around the world the percentage of water recovered with oil from subterranean wellbores has risen to be greater than the percentage of the oil. In fact, in many fields, the percentage of oil has decreased to be from about 20% in an excellent field to about 2% in a relatively poor field. Therefore, the operator must lift to the surface and then dispose of the resulting tremendous volume of water. This situation wastes energy because of the power needed to operate pumps to lift and separate the water, and causes an environmental problem. In many locations the separated water cannot be disposed of on the surface, so the water must be transported to a remote well site to be reinjected into a subterranean formation. There is a need for a method and related system for separating the oil from water downhole so that the quantity of water recovered to the earth's surface can be minimized, and hopefully, eliminated. One method of downhole oil and water separation is disclosed in U.S. Pat. Nos. 5,296,153 and 5,456,837, wherein wellbore fluids are dram through a hydrocyclone that separates the oil from water. An actual field installation configuration of such a prior system is shown in FIG. 1 hereof. The separated water is then introduced into a first pump to force the water into a subterranean formation, that is isolated from the formation from which the oil and water mixture is recovered from. The separated oil is introduced into a second pump to force the oil to the earth's surface for processing.

A significant disadvantage of the method disclosed in U.S. Pat. No. 5,296,153 is that the oil and water mixture must be dram through the hydrocyclone and then introduced into a pump. Further, the separated water must exit the separator and be conveyed to a remote location within the wellbore. This arrangement results in a significant loss of fluid head, so the loss in pumping efficiency limits the ability of the system to be used in higher volume wells and results in a waste of energy. There is a need for a method and related system that efficiently separates oil from water within a wellbore, and that efficiently disposes the separated water into subterranean formations.

Additionally, the system disclosed in the '153 patent presents problems with diametric clearances in wellbores. For example, in a 7 inch diameter casing, it is current practice to install an electric submergible pumping system of 5.62 inches in diameter. The resulting diametric clearance is insufficient for flow rate normal to 5.62 inch equipment to have fluid transfer passages (internal or external) along the pumping equipment, as is needed when fluids are to be recovered from one zone and gave one stream of the separated fluid injected into another zone while the other separated stream is directed to the earth's surface. If the smaller sized equipment is used, the production rate would be significantly limited. Further, a problem with the prior hydrocyclone configurations is that a series of complicated and relatively expensive cast manifolds and formed tubing must be used, which significantly add to the cost of the system.

In sizing the fluid separation equipment for actual wellbore sizes, it has been found that a limitation has occurred as to the number of hydrocyclones that can be fitted within a given housing size due to the relatively large fluid passages or conduits required to transfer the fluids into and out of the housings. Yet, such large sized conduits severely restrict the size of the hydrocyclones that can be used. There is a need for a fluid separation system that permits higher fluid capacity hydrocyclones be utilized than previously possible for a given cross-sectional area.

SUMMARY OF THE INVENTION

The present invention has been contemplated to overcome the foregoing deficiencies and meet the above described needs. Specifically, the present invention is a downhole fluid separation system used with submergible pumping systems to separate downhole fluids into different density fluids, recover the lighter fluids to the earth's surface, and dispose the heavier fluids downhole. The fluid separation system includes a plurality of housings connectable one to another, each housing having one or more fluid separators, such as hydrocyclones, therein with an inlet of each fluid separator in communication with an inlet conduit, an overflow of each fluid separator in communication with an overflow conduit, and an underflow of each fluid separator in communication with an underflow conduit. The fluid separation system can be configured for parallel flow where the conduits conveying fluids downstream of a first housing have a greater cross-sectional flow area than corresponding conduits in an adjacent second housing. Also, the fluid separation system can be configured for series flow, for either the separated lighter or the separated heavier fluids. The use of differing sized conduits in the housings as required for the actual flow rates in each housing enable higher capacity fluid separators to be used than previously possible for greater fluid handling efficiency.

DETAILED DESCRIPTION OF THE PREFERRED EMBODIMENTS

Figure 1:
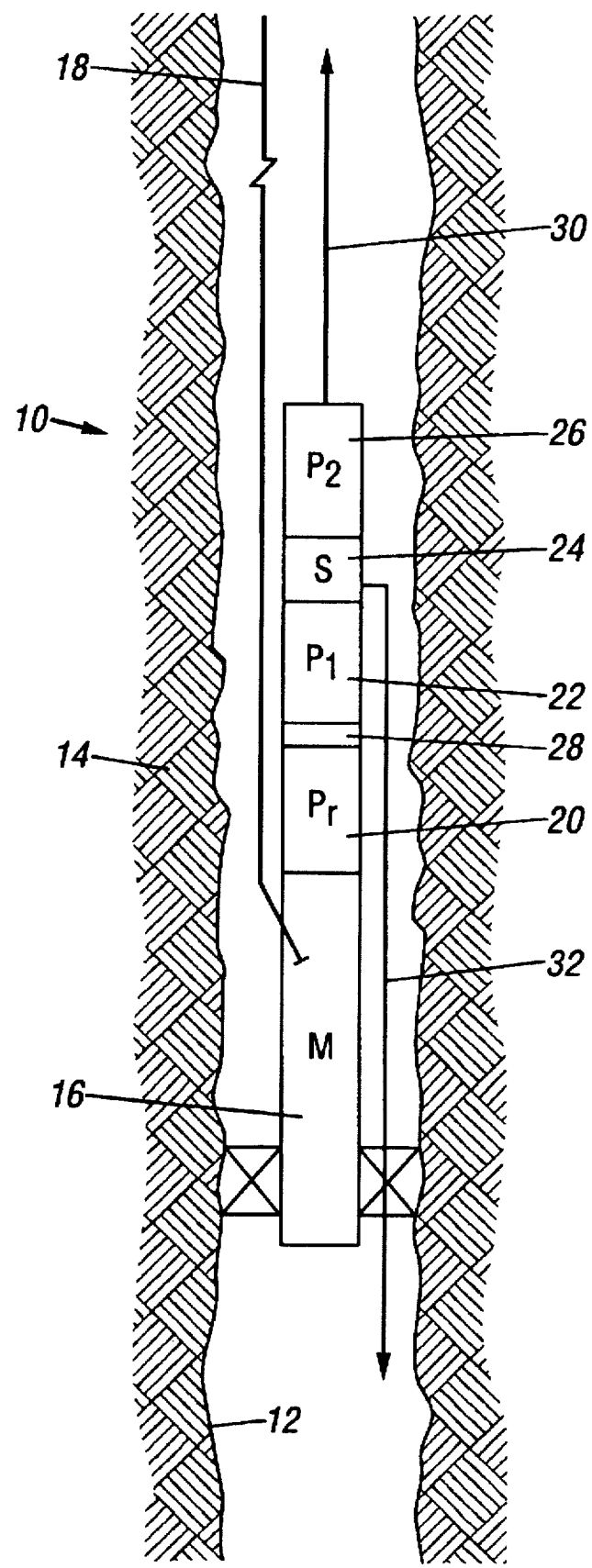
FIG. 1 is a side elevational view of one preferred embodiment of a downhole fluid separation system of the present invention connected within a submergible pumping system.

As briefly described above, the present invention comprises a fluid separation system to be installed within a wellbore that penetrates a production formation and a discharge formation. The production formation can comprise one or more earthen formations that contain fluids, such as oil, condensate, gas, and water. The discharge formation can comprise one or more earthen formations that an operator has chosen to use for the discharge and elimination of fluids that are not to be brought to the earth's surface. The fluid separation system of the present invention can be used in wellbores where the production formation(s) is closer to the earth's surface than the discharge formation(s), and visaversa. Since, the fluid separation system of the present invention can be used in vertical, inclined and horizontal wellbores, references herein to "above" and "below" are merely for ease of understanding and should not be considered in any way limiting.

The fluid separation system of the present invention utilizes fluid separators that separate fluids into differing components, such as by density. Devices that are suitable for use in the present invention include membrane fluid separators, electrostatic fluid separators, and centrifugal separators. The centrifugal separators used in the present invention can be separators where an internal device within the housing rotates to cause the fluids to rotate and thereby be separated, external devices where the housing rotates to cause the fluids to rotate and thereby be separated, and preferably conical devices where the fluids are caused to rotate by the shape of the separator. Hydrocyclones are most preferred due to their relatively low cost, no moving parts, and acceptable oil-water separation efficiency.

Throughout the following discussion the term "conduit" will be used in relation to conveying of fluids from one location to another. The term "conduit" shall mean any device, member, tube, pipe, hose, or space that can route a fluid from one location to another. In the context of downhole devices, a "conduit" will most likely refer to a pipe either within or without of a housing, or an annular space within the housing, between the outside of the housing and a pipe or casing in the wellbore, or between one or more concentric pipes or casings and the wellbore wall.

As previously mentioned, the present invention is a downhole fluid separation system used with submergible pumping systems to separate downhole fluids into different density fluids, recover the lighter fluids to the earth's surface, and dispose the heavier fluids downhole. The fluid separation system includes a plurality of housings connectable one to another, each housing having one or more fluid separators, such as hydrocyclones, therein with an inlet of each fluid separator in communication with an inlet conduit, an overflow of each fluid separator in communication with an overflow conduit, and an underflow of each fluid separator in communication with an underflow conduit. The fluid separation system can be configured for parallel flow where the conduits conveying fluids downstream of a first housing have a greater cross-sectional flow area than corresponding conduits in an adjacent second housing. Also, the fluid separation system can be configured for series flow, for either the separated lighter or the separated heavier fluids. The use of differing sized conduits in the housings as required for the actual flow rates in each housing enable higher flow capacity fluid separators to be used than previously possible for greater fluid handling efficiency.

In the following discussions reference will be made to downhole fluid pumping systems. Such systems can be downhole electric submergible pumping systems, as well as other downhole pumping systems, such as sucker rod pumps and other surface driven pumps.

To better understand the present invention, reference is made to the accompanying drawings. FIG. 1 shows an electric submergible pumping system 10 suspended within a wellbore 12 that penetrates one or more earthen formations 14. The pumping system 10 is commonly referred to as an "ESP" for electric submergible pumping system, and generally includes an electric motor 16 with electric power supplied from the earth's surface by a cable 18. An oil-filled motor protector 20 is connected to the motor 16 with a first pump 22, a fluid separator 24 and a second pump 26 all operatively connected thereto. Wellbore fluids, such as oil and water, are introduced into a intake 28 of the first pump 22, and driven into the fluid separator 24 wherein the fluids are separated into two fluid streams of differing densities. The lighter density fluid, such as oil, is conveyed into the second pump 26 where such lighter density fluid is conveyed to the earth's surface through a conduit 30. The higher density fluid, such as water, is conveyed to a downhole location, which is remote from and fluidicly isolated from the fluid intake 28, through a conduit 32. The two pumps 22 and 26 are shown being operated by a single drive means, i.e. the motor 16; however, each pump may be connected to its own separate means of operation, such as separate downhole electric motors, surface drives, and the like.

Figure 2:
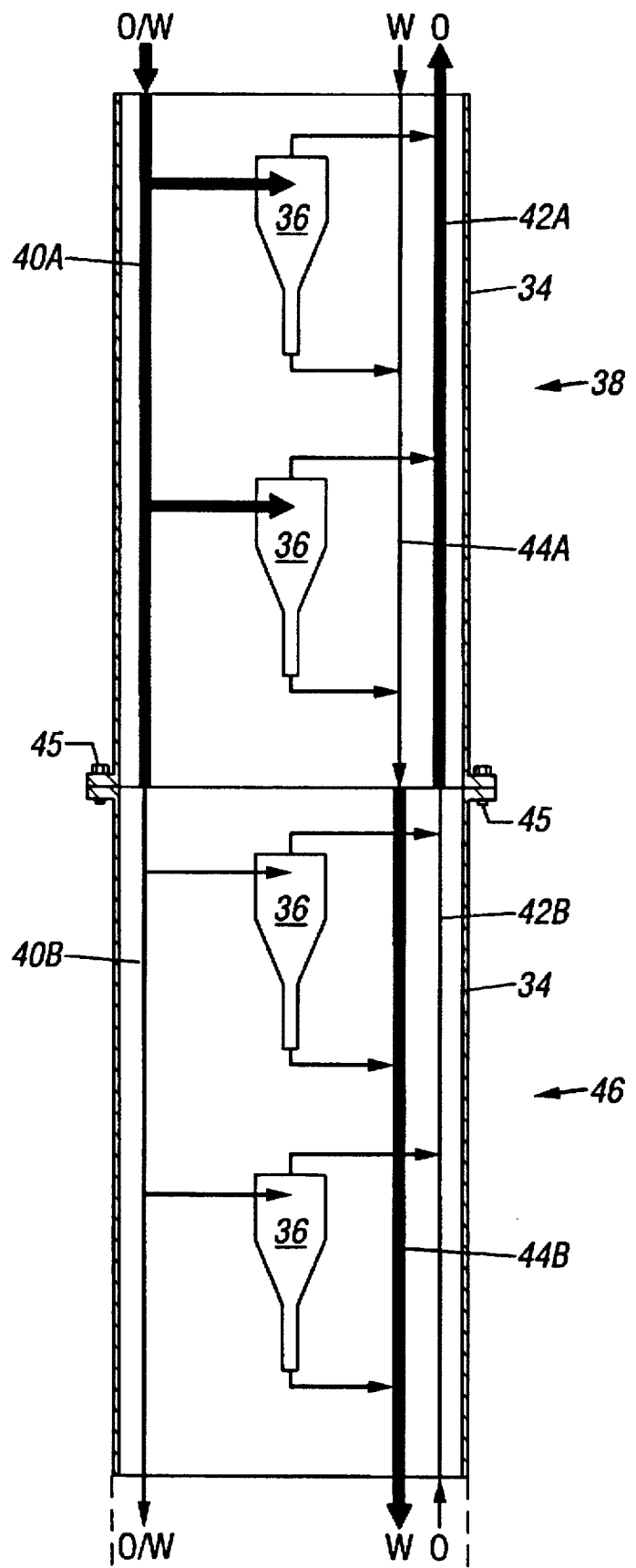
FIG. 2 is a cross sectional view of one preferred embodiment of a downhole fluid separation system of the present invention configured for parallel fluid flow.
Figure 3:
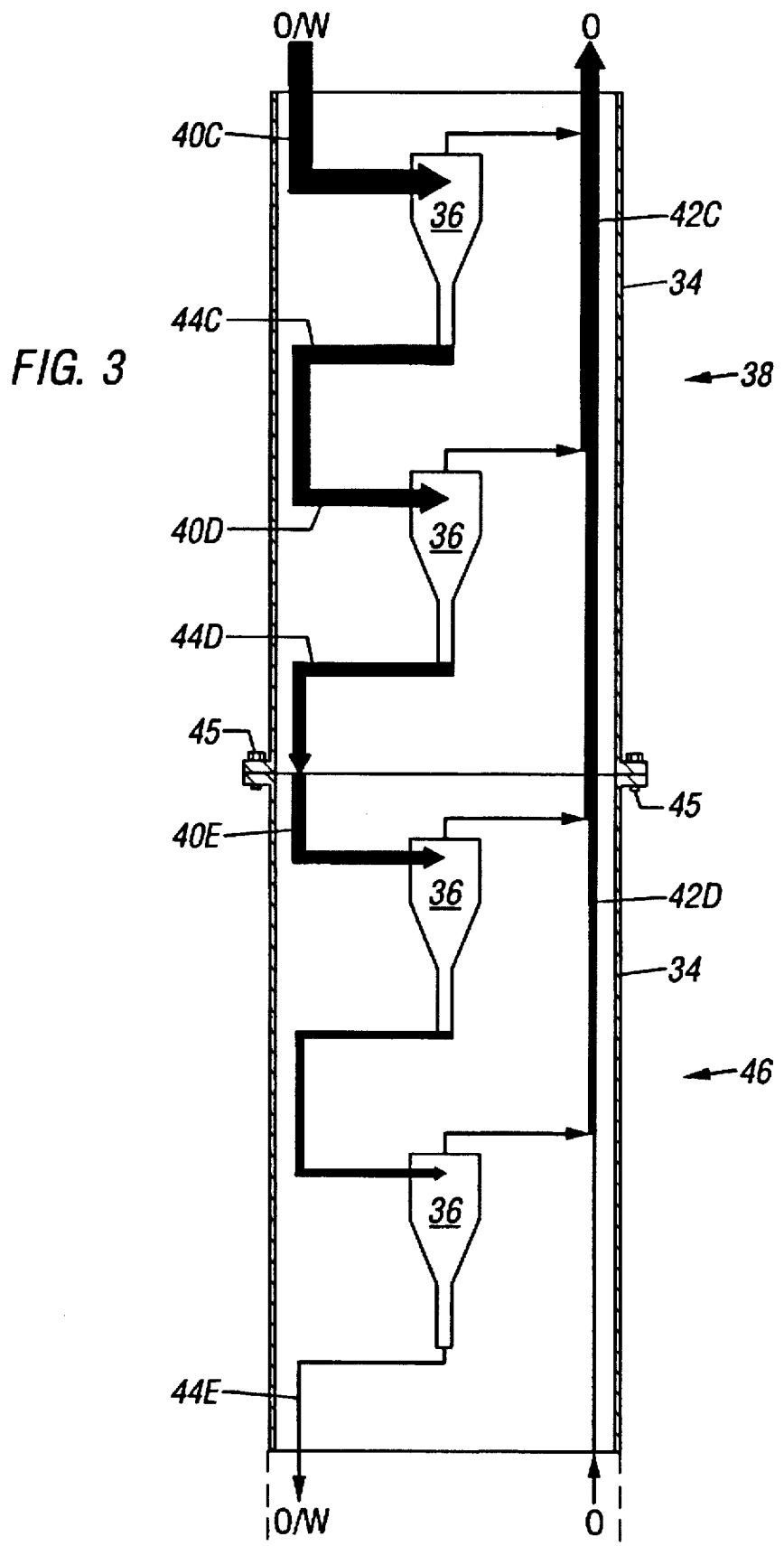
FIG. 3 is a cross sectional view of one preferred embodiment of a downhole fluid separation system of the present invention configured for series fluid flow on the heavier separated fluids.
Figure 4:
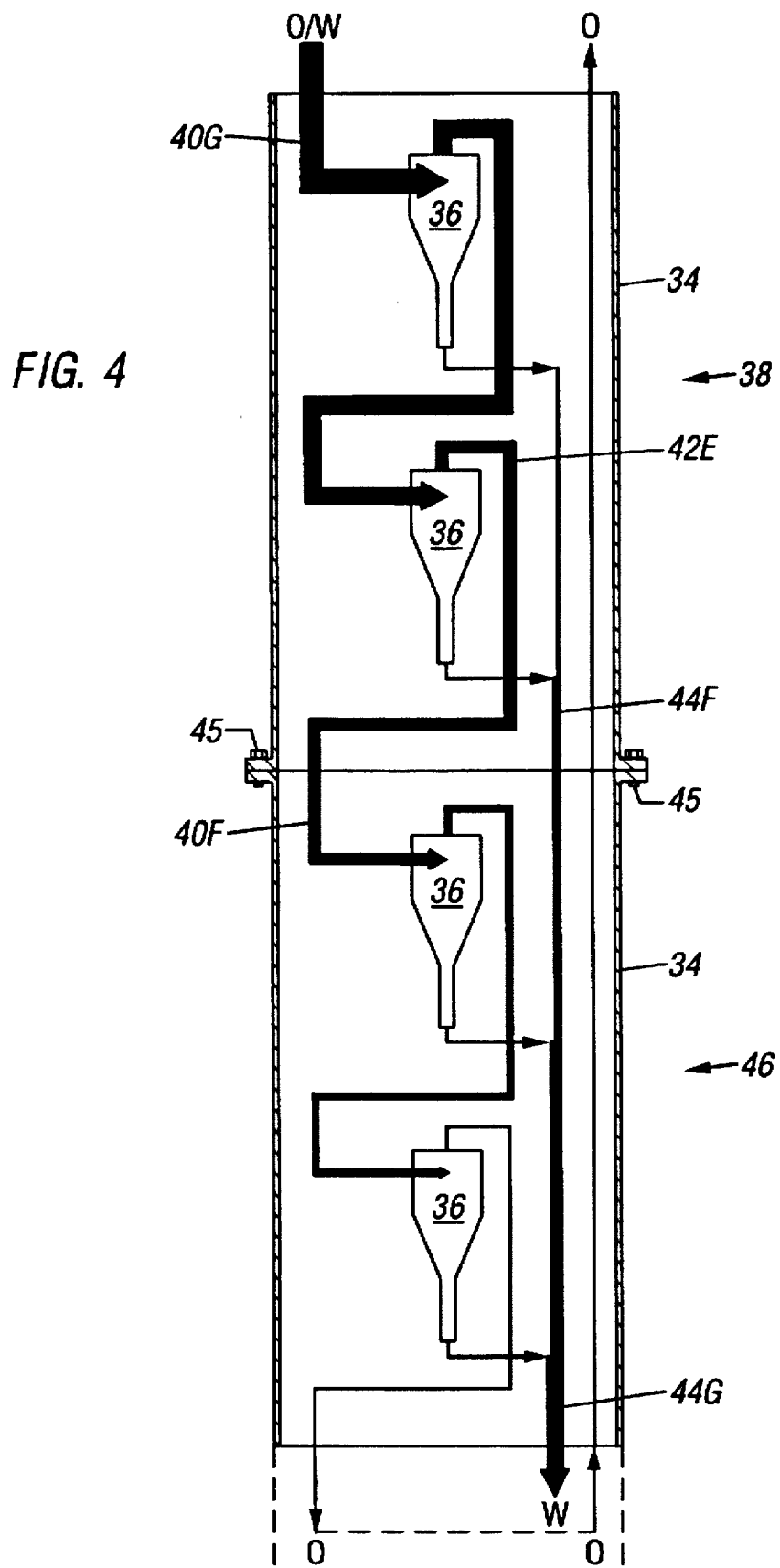
FIG. 4 is a cross sectional view of one preferred embodiment of a downhole fluid separation system of the present invention configured for series fluid flow on the lighter separated fluids.

The present invention is primarily directed to the fluid separator 24 which comprises at least one and preferably a plurality of separate housings with each housing being connectable one to the other by flanges and bolts, threaded connections, or other known connection devices. As shown in FIGS. 2, 3 and 4, each housing includes a generally cylindrical housing body 34 the interior of which includes one or preferably a plurality of separation devices. The separation devices can be one or more filters, membranes, electrostatic devices, rotary vane separators, static or moving centrifugal separators, or any combination of these devices. For reasons of low cost and ruggedness, the fluid streams are most preferably separated by one or more hydrocyclones. Disposed within the housing body 34 are one or more hydrocyclones 36 in a generally tandem or longitudinally aligned relationship. The orientation of the hydrocyclones 36 is not considered important for functionality reasons, but the orientation is important for fitting the appropriate sized hydrocyclones and associated plumbing within the space confines of the interior and exterior of the housing body 34. The hydrocyclones 36 can be longitudinally aligned, helically arranged, radially arranged, nose-to-tail, or any other suitable arrangement or combination as is desired.

The wellbore fluids, such as oil and water, pass directly into the housing body and then to the pump, as is described in U.S. Pat. No. 5,296,153, or preferably as shown in FIG. 1 where the wellbore fluids exit the first pump 22 and are introduced into the interior of the housing body 34 of a first housing 38. As shown in FIG. 2, these wellbore fluids are conveyed, by way of an inlet conduit 40A, that can either be one or more separate tubes or the interior space of the housing body 34 itself, to a tangential inlet opening (not shown) in each hydrocyclone 36. The fluids spin upon entering the interior of the hydrocyclone 36, and thereby are separated into the first stream and the second less dense stream. The second stream, being primarily oil, exits each hydrocyclone 36 through a central overflow opening (not shown) and enters an overflow conduit 42A that conveys the collected second stream eventually to the earth's surface through the conduit 30. The separated first stream, being primarily water, exits each hydrocyclone 36 through a central underflow opening (not shown) and enters an underflow conduit 44A that conveys the collected first stream eventually to a remote wellbore location through the conduit 32.

FIG. 2 shows an arrangement of two or more housing bodies 34 interconnected in any known manner. For example, the first housing 38 is connected by means of bolts 45 to a second housing 46. The differences between the two housing bodies are the cross sectional flow areas of the conduits are different. Specifically, in FIG. 2 the flow circuitry is for parallel fluid flow where the wellbore fluids enter the inlet conduit 40A of the first housing 38, are passed to each hydrocyclone 36 therein, and then on to an inlet conduit 40B of the second housing 46, and so on. The inlet conduit 40A ahead of the first hydrocyclone 36 in the first housing 38 must handle 100% of the inlet flow, yet the last hydrocyclone 36 in the last (in this case, the second) housing 46 will only take the remaining portion of the inlet flow (in this case, the remaining 25% for a four hydrocyclone system). This being the case, the cross-sectional flow area of the inlet conduit can decrease in size for each hydrocyclone downstream or can decrease for each housing downstream. This decrease in cross-sectional flow area can provide needed extra space within each housing body that heretofore has not been available.

Further, an overflow conduit 42A of the first housing 38 has a greater cross-sectional flow area than an overflow conduit 42B of the second housing 46, since the last hydrocyclone 36 (in this case, the fourth hydrocyclone) in the second housing 46 provides the first 25% of the separated oil with the next downstream hydrocyclone (in this case, the third hydrocyclone) provides an additional 25% and so on. Likewise, an underflow conduit 44B of the second housing 46 has a greater cross-sectional flow area than an conduit 44A of the first housing 38 as a result of the same reasoning. With this arrangement of larger and smaller conduits, the interior space of each housing can be maximized to permit the greatest sized hydrocyclones to be used for maximum separation efficiency.

In one preferred embodiment of the present invention, the housings 34 would be generally identical in outside diameter and length, but the interior of which would include the specific conduit arrangements for being the first, second, third, etc. housing connected downstream. As such, a first and a second housing could be used, as well as a second and a third housing. But, the arrangements need to be in sequential order (i.e., 1-2-3, etc.), and not any sequence with a mixed order (i.e., 1-3-2).

In the event that series flow is desired the configuration of FIG. 3 can be used to achieve purer higher density fluids, such as water. In this alternate preferred embodiment, an underflow conduit 44C of the first hydrocyclone 36 is in communication with an inlet conduit 40D of the next downstream hydrocyclone 36. Likewise, an underflow conduit 44D of the last hydrocyclone 36 in the first housing 36 in communication with an inlet conduit 40E of the first hydrocyclone 36 in the second housing 46. The overflow conduit 42 of the first housing 38 is in communication with the overflow conduit 42 of the second housing 46. As for the space saving reasoning described in relation to FIG. 2, the inlet conduit 40C of the first housing 38 has a greater cross-sectional flow area than the inlet conduit 40E of the second housing 46. Preferably, but not necessarily, the underflow conduit 44D of the first housing 38 has a greater cross-sectional flow area than an underflow conduit 44E of the second housing 46. And, an overflow conduit 42C of the first housing 38 has a greater cross-sectional flow area than an overflow conduit 42D of the second housing 46.

In the event that series flow is desired the configuration of FIG. 4 can be used to achieve purer lower density fluids, such as oil. In this alternate preferred embodiment, an underflow conduit 44F of the first housing 38 is in communication with an underflow conduit 44G of the second housing 46. The overflow conduit 42E of the first housing 38 is in communication with an inlet conduit 40F of the second housing 46. For the same space sizing reasoning as before, an inlet conduit 40G of the first housing 38 has a greater cross-sectional flow area than the inlet conduit 40F of the second housing 46. Preferably, but not necessarily, the underflow conduit 44G of the second housing 46 has a greater cross-sectional flow area than the underflow conduit 44F of the first housing 38; and the overflow conduit 42E of the first housing 38 has a greater cross-sectional flow area than an overflow conduit 42F of the second housing 46.

While the differing cross-sectional flow areas have been described in reference of one housing to another, it should be understood that the same reasoning can apply to the size of the conduits from one fluid separator to the next within the same housing.

The relative location of the motor, protector, pumps and separator to each other as illustrated is only one of the many ways that these components can be arranged. The components can be reordered in different sequences to fit the relative location of the production zone, injection zone and the surface. The arrangement as illustrated should not be considered as any limitation to the applications. Furthermore, one or multiple pumps may be used depending on the injection pressure and lifting pressure required. One or multiple motors may be used depending on the horsepower or independent speed control capability required. One or multiple separators may be used depending on the capacity and purity of the separated fluid required. When multiple pieces of these equipment are used, they may be adjacent or spaced from each other depending on the direction of the fluid flow required.

Wherein the present invention has been described in particular relation to the drawings attached hereto, it should be understood that other and further modifications, apart from those shown or suggested herein, may be made within the scope and spirit of the present invention.

What is claimed is:

1. A downhole fluid separation system comprising:
   a plurality of housings connectable one to another, each housing having one or more centrifugal fluid separators therein with an inlet of each centrifugal fluid separator in fluid communication with an inlet conduit, an overflow of each centrifugal fluid separator in fluid communication with an overflow conduit, and an underflow of each centrifugal fluid separator in fluid communication with an underflow conduit:

the inlet, overflow and under flow conduits of a first housing are in fluid communication with the inlet, overflow and underflow conduits, respectively, of an adjacent second housing;

the inlet conduit of a housing where inlet fluids first enter has a greater cross-sectional flow area than the inlet conduit of a downstream housing;

the overflow conduit of the housing where overflow fluids last exit has a greater cross-sectional flow area than the overflow conduit of an adjacent upstream housing; and the under flow conduit of a housing where underflow fluid last exit has a greater cross-sectional flow area than the underflow conduit of an adjacent upstream housing.

2. A downhole fluid separation system of claim 1 wherein the centrifugal fluid separators are hydrocyclones.

3. A downhole fluid separation system comprising:
   a plurality of housings connectable one to another, each housing having one or more centrifugal fluid separators therein with an inlet of each centrifugal fluid separator in fluid communication with an inlet conduit, an overflow of each centrifugal fluid separator in fluid communication with an overflow conduit, and an underflow of each centrifugal fluid separator in fluid communication with an under flow conduit:

the underflow conduit of a first of the housings is in fluid communication with the inlet conduit of an adjacent second of the housings;

the overflow conduit of the first housing is in fluid communication with the overflow conduit of the second housing; and the inlet conduit of the first housing has a greater cross-sectional flow area than the inlet conduit of the second housing.

4. A downhole fluid separation system of claim 3 wherein the underflow conduit of the first housing has a greater cross-sectional flow area than the underflow conduit of the second housing.

5. A downhole fluid separation system of claim 3 wherein the overflow conduit of the first housing has a greater cross-sectional flow area than the overflow conduit of the second housing.

6. A downhole fluid separation system of claim 3 wherein the centrifugal fluid separators are hydrocyclones.

7. A downhole fluid separation system comprising:

a plurality of housings connectable one to another, each housing having one or more centrifugal fluid separators therein with an inlet of each centrifugal fluid separator in fluid communication with an inlet conduit, an overflow of each centrifugal fluid separator in fluid communication with an overflow conduit, and an underflow of each centrifugal fluid separator in fluid communication with an underflow conduit:

the underflow conduit of a first of the housings is in fluid communication with the underflow conduit of an adjacent second of the housings;

the overflow conduit of the first housing is in fluid communication with the inlet conduit of the second housing; and the inlet conduit of the first housing has a greater cross-sectional flow area than the inlet conduit of the second housing.

8. A downhole fluid separation system of claim 7 wherein the underflow conduit of the second housing has a greater cross-sectional flow area than the underflow conduit of the first housing.

9. A downhole fluid separation system of claim 7 wherein the overflow conduit of the first housing has a greater cross-sectional flow area than the overflow conduit of the second housing.

10. A downhole fluid separation system of claim 7 wherein the centrifugal fluid separators are hydrocyclones.

11. A downhole fluid separation system comprising:

a plurality of housings connectable one to another, each housing having therein one or more separator means for separating fluid into differing components with an inlet of each separator means in fluid communication with an inlet conduit, a first outlet of each separator means in fluid communication with a first conduit, and a second outlet of each separator means in fluid communication with a second conduit;

the inlet, first and second conduits of a first housing are in fluid communication with the inlet, first and second conduits, respectively, of an adjacent second housing;

the inlet conduit of a housing where inlet fluids first enter has a greater cross-sectional flow area than the inlet conduit of a downstream housing;

the first conduit of the housing where fluids, collected from the first outlets, last exit has a greater cross-sectional flow area than the first conduit of an adjacent upstream housing; and the second conduit of a housing where fluids, collected from the second outlets, last exit has a greater cross-sectional flow area than the second conduit of an adjacent upstream housing.

12. A downhole fluid separation system comprising:

a plurality of housings connectable one to another, each housing having therein one or more separator means for separating fluid into differing components with an inlet of each separator means in fluid communication with an inlet conduit, a first outlet of each separator means in fluid communication with a first conduit, and a second outlet of each separator means in fluid communication with a second conduit;

the second conduit of a first of the housings is in fluid communication with the inlet conduit of an adjacent second of the housings;

the first conduit of the first housing is in fluid communication with the first conduit of the second housing; and the inlet conduit of the first housing has a greater cross-sectional flow area than the inlet conduit of the second housing.

13. A downhole fluid separation system comprising:

a plurality of housings connectable one to another, each housing having therein one or more separator means for separating fluid into differing components with an inlet of each separator means in fluid communication with an inlet conduit, a first outlet of each separator means in fluid communication with a first conduit, and a second outlet of each separator means in fluid communication with a second conduit;

the second conduit of a first of the housings is in fluid communication with the second conduit of an adjacent second of the housings;

the first conduit of the first housing is in fluid communication with the inlet conduit of the second housing; and the inlet conduit of the first housing has a greater cross-sectional flow area than the inlet conduit of the second housing.

* * * * *